United States Patent
Li et al.

(10) Patent No.: US 11,560,455 B2
(45) Date of Patent: Jan. 24, 2023

(54) METHOD FOR RAPID GELATION OF SILK FIBROIN SOLUTION UNDER PHYSIOLOGICAL CONDITIONS

(71) Applicant: SOOCHOW UNIVERSITY, Suzhou (CN)

(72) Inventors: Xinming Li, Suzhou (CN); Baochang Cheng, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 1059 days.

(21) Appl. No.: 16/314,855

(22) PCT Filed: Mar. 30, 2018

(86) PCT No.: PCT/CN2018/081245
§ 371 (c)(1),
(2) Date: Jan. 2, 2019

(87) PCT Pub. No.: WO2019/095610
PCT Pub. Date: May 23, 2019

(65) Prior Publication Data
US 2021/0324149 A1 Oct. 21, 2021

(30) Foreign Application Priority Data
Nov. 17, 2017 (CN) .......................... 201711143052.4

(51) Int. Cl.
C08J 3/075 (2006.01)

(52) U.S. Cl.
CPC ........... C08J 3/075 (2013.01); C08J 2389/00 (2013.01)

(58) Field of Classification Search
CPC ............................... C08J 3/075; C08J 2389/00
See application file for complete search history.

(56) References Cited

FOREIGN PATENT DOCUMENTS

| CN | 101772348 A | 7/2010 |
| CN | 103819694 A | 5/2014 |
| CN | 103965491 A | 8/2014 |
| CN | 106866996 A | 6/2017 |

OTHER PUBLICATIONS

Cheng et al ("Cooperative assembly of a peptide gelator and silk fibroin afford an injectable hydrogel for tissue engineering", ACS Appl. Mater. Interfaces 2018, 10, 12474-12484) (Year: 2018).*

* cited by examiner

Primary Examiner — Leigh C Maier
Assistant Examiner — Everett White
(74) Attorney, Agent, or Firm — SZDC Law P.C.

(57) ABSTRACT

The invention provides a method for rapid gelation of a silk fibroin solution under physiological conditions. The method comprises steps of: (1) weighing NapFF solid powder into a glass vial and adding ultrapure water; (2) adding a NaOH solution, dissolving and heating for 1-2 min at 70° C. to form a transparent solution; (3) slowly adding a HCl solution and stirring until the pH is 7.2-7.5; (4) adding a silk fibroin solution; (5) adding ultrapure water to set the volume to 200 μL; and (6) standing horizontally, and observing the gelation process by tilting and inverting the glass vial. In the invention a low concentration of silk fibroin solution can be induced to rapidly gelate in a short time. The silk fibroin gel can be degraded by proteolytic hydrolysis in human body, has no toxic side effects, has good biocompatibility, and thus can be used as a good biomaterial.

8 Claims, 9 Drawing Sheets

METHOD FOR RAPID GELATION OF SILK FIBROIN SOLUTION UNDER PHYSIOLOGICAL CONDITIONS

This application is the National Stage Application of PCT/CN2018/081245, filed on Mar. 30, 2018, which claims priority to Chinese Patent Application No. 201711143052.4, filed on Nov. 17, 2017, which is incorporated by reference for all purposes as if fully set forth herein.

FIELD OF THE INVENTION

The present invention relates to a method for rapid gelation of a silk fibroin solution under physiological conditions.

DESCRIPTION OF THE RELATED ART

Silk fibroin is a natural macromolecular polymer protein extracted from silk, which is present in an amount of about 70% to 80% of the silk, and contains 18 kinds of amino acids, among which glycine (gly), alanine (Ala) and serine (ser) account for more than 80% of the total content. Silk fibroin itself has good mechanical performances and physical and chemical properties, for example, good flexibility and tensile strength, air and moisture permeability, and sustained release, etc. Different forms can be obtained from different treatments, such as nanofibers, nanoparticles, silk fibroin films, sponge-like porous scaffold materials, silk fibroin hydrogel and various materials made by electrostatic spinning. Silk fibroin has long been widely used by researchers in biomedical materials due to its slow biodegradation, good biocompatibility, low immunogenicity, and other excellent properties. However, under physiological conditions, the gelation process of the silk fibroin solution is very slow and usually takes place only under an acidic condition (about pH 4) over a considerable period of time (>5 days) at a high concentration (>4%). These factors have greatly limited its use in the biomedical field. Recent studies have shown that, in order to change the characteristics of low pH, high concentration and long time required for gelation of silk fibroin, scientists have made many attempts to allow the silk fibroin to transform from a random coil structure in a solution to a beta-pleated sheet structure in a gel state under physiological conditions, for example, by applying a vortex flow or an electric field to the silk fibroin solution, or performing sonication on the silk fibroin solution for a long time. However, these externally applied conditions are greatly limited in a situation when silk fibroin is practically used as a biological material. Attempts are also made by scientific researchers to add organic small molecules or high molecular polymers (such as ethanol, the surfactant sodium dodecyl sulfate, or the hydrophilic polymer polyethylene glycol) to the silk fibroin solution, to accelerate the gelation rate of the silk fibroin solution by adjusting their interaction with the chain of silk fibroin. However, these series of gelation processes may be incompatible with some clinical environments for use, due to the potential cytotoxicity and tissue toxicity of these organic molecules, and the biological inertness of polymers and difficulty in degradation in vivo. Although these methods can shorten the gelation time of silk fibroin to some extent, the obtained silk fibroin gel has poor biocompatibility or high cytotoxicity. These problems lead to significant limitations on its use in biomedical fields.

SUMMARY OF THE INVENTION

To solve the above problems in the prior art, an object of the present invention is to provide a method for rapid gelation of a silk fibroin solution under physiological conditions, by which a low concentration of silk fibroin solution can be induced to rapidly gelate in a short time. The silk fibroin gel can be degraded in vivo by proteolytic hydrolysis in human body, has no toxic side effects, has good biocompatibility, and can be used as a good biomaterial.

For the above purpose, the following technical solutions are utilized in the present invention.

In one aspect, the present invention provides a method for rapid gelation of a silk fibroin solution under physiological conditions, and the method comprises the following steps:

(1) weighing 0.4-0.8 mg of 2-naphthaleneacetic acid-phenylalanine-phenylalanine solid powder into the bottom of a glass vial and adding 130-170 μL of ultrapure water;

(2) adding 8-12 μL of a 1 mol/L NaOH solution in ultrapure water, ultrasonically dissolving, and heating the bottom of the vial for 1-2 min to form a transparent solution;

(3) slowly adding a HCl solution in ultrapure water and mixing well by stirring with a pipette tip until the pH of the solution is 7.2-7.5;

(4) adding 1-34 μL of a silk fibroin solution;

(5) adding ultrapure water; and (6) standing horizontally and observing the gelation process by tilting and inverting the glass vial every 1 min-1 h, to allow the silk fibroin solution to gelate rapidly.

Preferably, in Step (2), a microcomputer electric heating plate capable of precise temperature control is used for heating at 70° C.

Preferably, in Step (3), the HCl solution added has a molar concentration of 1 mol/L.

Preferably, in Step (4), the silk fibroin solution has a concentration of 12.03 wt %.

Preferably, in Step (5), the volume was made up to 200 μL.

More preferably, in Step (3), the pH of the solution is 7.4.

More preferably, the silk fibroin solution is prepared by steps of:

Step 1: silk degumming weighing 6.36 g of anhydrous sodium carbonate and dissolving in 3 L of ultrapure water, adding 7.5 g of silk and boiling for 1 h, then removing the silk and air drying overnight at room temperature, to obtain degummed silk;

Step 2: silk dissolution preparing 40 mL of a 9.3 M LiBr solution, adding the degummed silk and 30 ml of the LiBr solution to a round bottom flask, and stirring for 4 h at a temperature of 60° C. and a rotation speed of 200 rpm;

Step 3: dialysis of silk fibroin solution transferring the LiBr solution containing silk fibroin to a dialysis bag with a molecular weight cut off of 3500, and dialyzing against ultrapure water for 4 days by changing the ultrapure water every 1 h, and then changing the ultrapure water every 2-5 hours after 10 hours;

Step 4: solution concentration after LiBr is completely dialyzed out, removing the dialysis bag, applying PEG20000 evenly on the surface of the dialysis bag for water absorption and concentration, applying an appropriate amount of PEG20000 again after the PEG20000 on the surface becomes viscous, and concentrating for one day until the solution becomes yellowish;

Step 5: centrifugation centrifuging the concentrated solution at 4° C. and 4000 r/min for 40 min, collecting the supernatant after centrifugation, and discarding a small amount of impurities; and Step 6: concentration determination determining the concentration of silk fibroin by a subtraction method, comprising preparing a clean glass evaporating dish, accurately weighing the clean glass evaporating dish using an analytical balance with an accuracy of 1/10000 g, and recording the weight as $m_0$; pipetting 100 μL of the silk fibroin solution onto the evaporating dish, accurately weighing the evaporating dish using an analytical balance with an accuracy of 1/10000 g, and recording the weight as $m_1$; drying the glass evaporating dish containing the silk fibroin solution for 5-6 h in an oven at 60° C., removing, cooling, and accurately weighing the evaporating dish, and recording the weight as $m_2$; and then calculating the concentration according to a formula:

$$c = \frac{m_2 - m_0}{m_1 - m_0} \times 100\%.$$

The concentration determined is an average of the measurements from three parallel glass evaporating dishes. The average concentration of the silk fibroin (SF) solution is determined as 12.03%.

More preferably, in Step (4), the volume of the silk fibroin solution is 34

In another aspect, the present invention also provides a silk fibroin gel prepared by the above method.

In still another aspect, the present invention also provides use of the silk fibroin in production of biomedical materials.

As compared with the prior art, the invention has the following advantages: the invention provides a method for rapid gelation of a silk fibroin solution under physiological conditions, by which a low concentration of silk fibroin solution can be induced to rapidly gelate in a short time. Moreover, because the small peptide derivative of NapFF has good biocompatibility, and can be degraded in vivo by proteolytic hydrolysis in human body without producing any toxic side effect, the prepared hybrid gel of the small peptide derivative of NapFF and silk fibroin has good biocompatibility, and can be used as a good biomaterial after the silk fibroin solution is induced to gelate rapidly under physiological conditions, thereby changing the dilemma in which after the silk fibroin solution is induced to gelate by a series of conventional inducers such as high molecular polymers, ethanol, and surfactants, the resulting gel cannot be used as a biomaterial.

BRIEF DESCRIPTION OF THE DRAWINGS

FIG. 1 shows a gel formation process and performance test in Comparative Example 1, wherein FIG. 1A shows a NapFF gel formation process; FIG. 1-B shows an TEM image (scale bar=200 nm) of a NapFF solution, the fiber width being about 12 nm; FIG. 1C shows a rheological test under stress sweep (where G' denotes storage modulus, and G" denotes loss modulus); and FIG. 1D shows the rheological properties characterized under frequency sweep.

FIG. 2 shows a gel formation process and performance test in Comparative Example 2, wherein FIG. 2A shows a gel formation process of a silk fibroin solution; FIG. 2 B shows an TEM image (scale bar=100 nm) of the silk fibroin solution, the fiber width being about 7 nm; FIG. 2C shows a rheological test under stress sweep; and FIG. 2D shows the rheological properties characterized under frequency sweep.

FIG. 3 shows a gel formation process and performance test in embodiment 1, wherein FIG. 3A shows a gel formation process of a mixed solution, the gelation time being 1.5 h; FIG. 3B shows an TEM image (scale bar=100 nm) of embodiment 1, nanofibers of two compositions with different lengths can be easily identified; and FIG. 3C shows the rheological properties of embodiment 1 characterized under frequency sweep.

In FIG. 4.

In FIG. 5.

In FIG. 6.

In FIG. 7.

In FIG. 8.

DETAILED DESCRIPTION OF THE PREFERRED EMBODIMENTS

Figure 1:
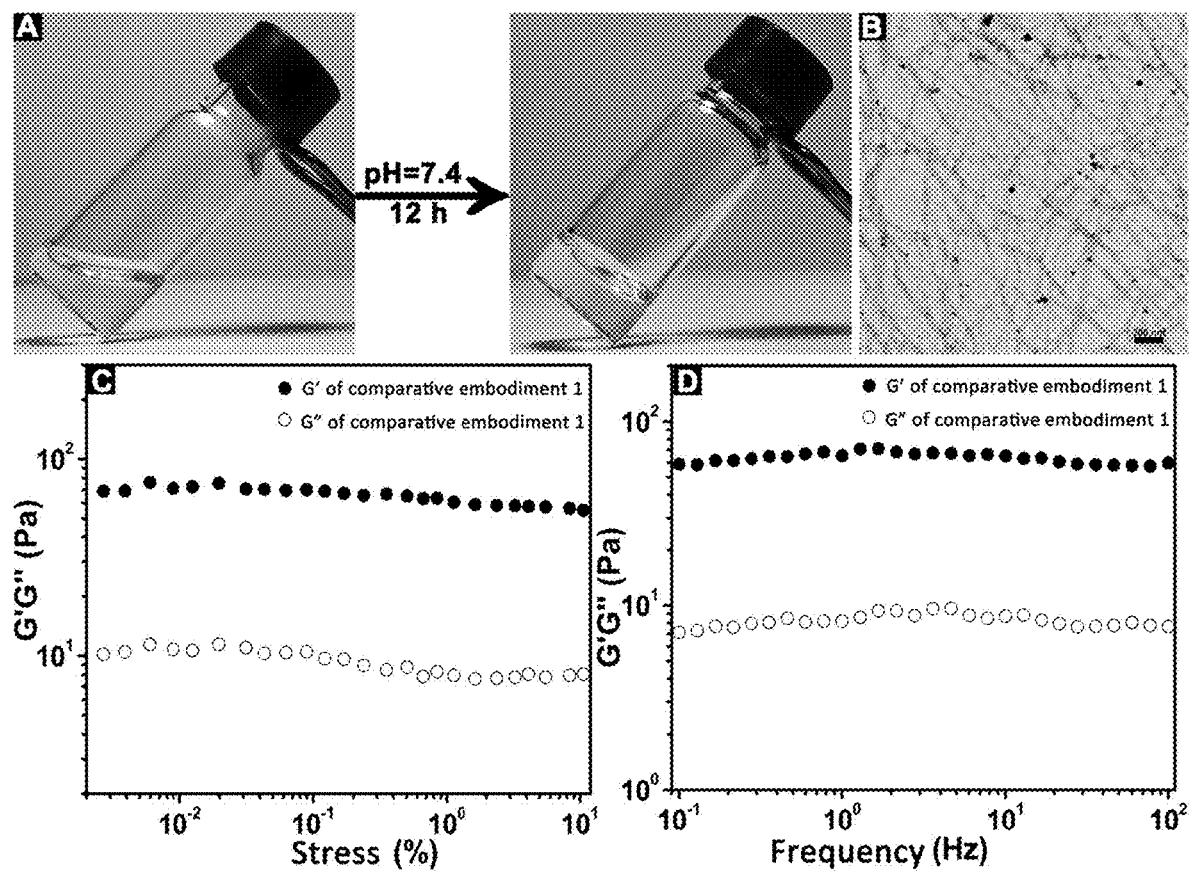
Figure 2:
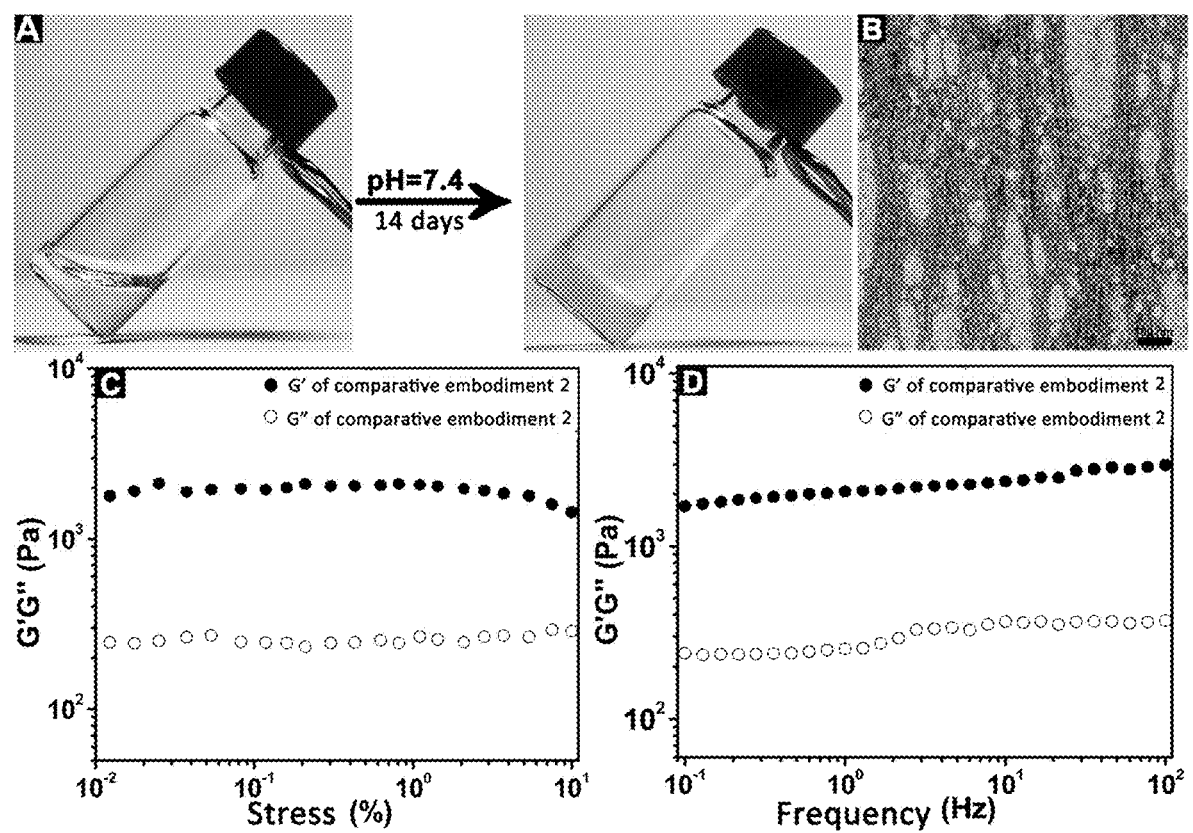
Figure 3:
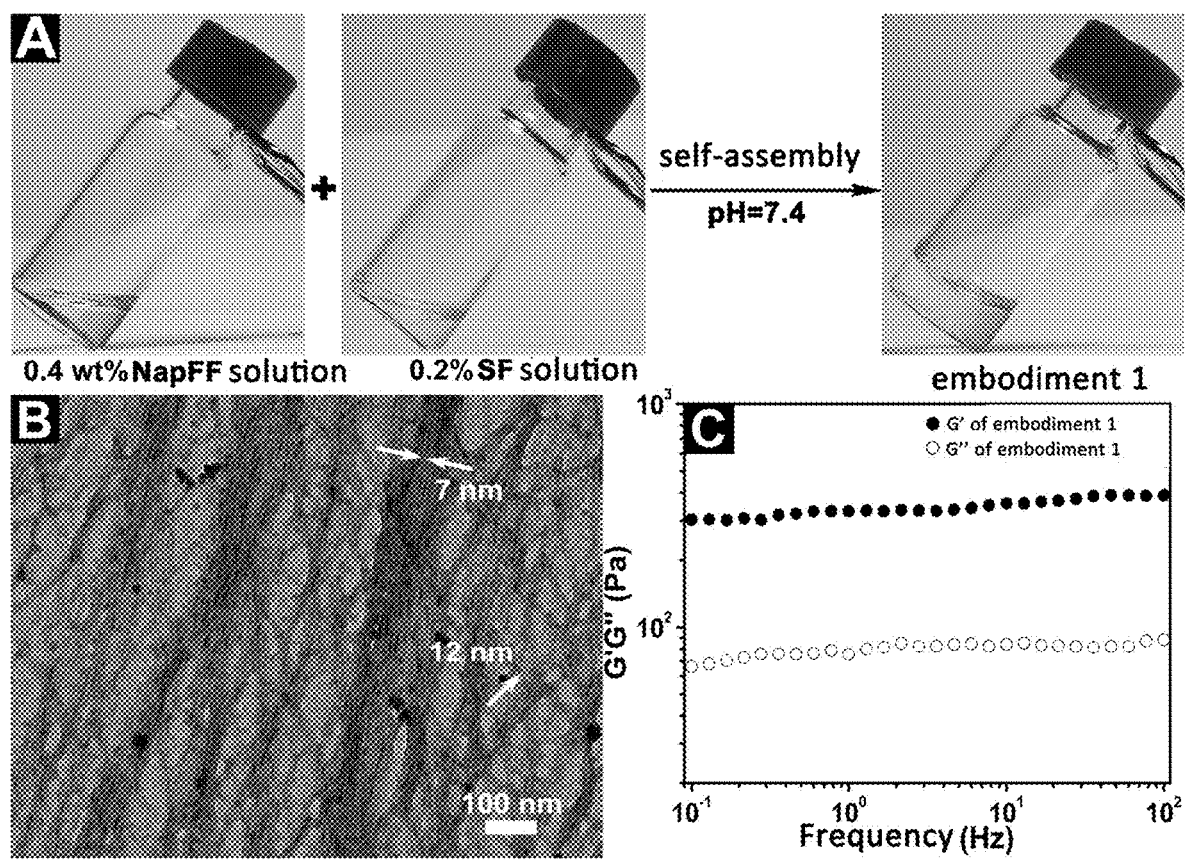

Solid-phase synthesis of small peptide derivative 2-naphthaleneacetic acid-phenylalanine-phenylalanine (NapFF):

a) Swelling of Resin 2 g of 2-chlorotrityl chloride resin (100-200 meshes, 0.3-0.8 mmol/g) was placed in a solid phase synthesis reactor, and fully swollen for about 1 h by adding dehydrated and dry dichloromethane (DCM) while high-purity (99.999%) nitrogen was introduced in an amount that just allows the resin to suspend fully, but less vigorously in the liquid. After swelling, the resin was squeezed with nitrogen to remove DCM completely, and washed 5 times with anhydrous N, N-dimethyl formamide (DMF) for 30 s each.

b) Attachment of Fmoc-Phe-OH 2712 mg of Fmoc-Phe-OH was weighed (where there are 1.2-1.7 mmol active sites on 1 g of resin on average), dissolved in about 20 mL of anhydrous DMF, added with 3.04 mL of N, N-diisopropylethyl amine (DIEA), ultrasonically dissolved, mixed fully, and then added to a reactor. The resin was agitated for about 2 h with a stream of nitrogen, fully reacted, squeezed with nitrogen to remove the remaining waste liquid, and then washed three times with anhydrous DMF for 30 s each.

c) Inactivation of Non-Reacted Active Sites on the Resin 32 mL of anhydrous DCM, 6 mL of anhydrous methanol (MeOH), and 2 mL of DIEA were mixed fully, and used to wash the resin two times for 10 min each. After full reaction, the resin was squeezed with nitrogen to remove the waste liquid, and then washed three times with anhydrous DMF for 30 s each.

d) Removal of Fmoc Protecting Group 50 mL of a 20% piperidine solution (20 mL of piperidine: 80 mL of anhydrous DMF) was prepared, and used to wash fully three times for 10 min each. After full reaction, the resin was squeezed with nitrogen to expel the waste liquid, and then washed three times with anhydrous DMF for 30 s each.

e) Attachment of Fmoc-Phe-OH 2712 mg of Fmoc-Phe-OH was weighed, dissolved in 20 mL of anhydrous DMF, added with 3.04 mL of DIEA and 2628 mg of O-benzotriazole-tetramethyluroniumhexafluorophosphate (HBTU), ultrasonically dissolved, mixed fully, and then added to a reactor. The resin was agitated for about 2 h with a stream of nitrogen, fully reacted, squeezed with nitrogen to remove the remaining waste liquid, and then washed three times with anhydrous DMF for 30 s each.

f) Removal of Fmoc Protecting Group

With 50 mL of a 20% piperidine solution, the resin was fully washed three times for 10 min each. After full reaction, the resin was squeezed with nitrogen to remove the waste liquid, and then washed three times with anhydrous DMF for 30 s each.

g) Attachment of 2-Naphthaleneacetic Acid 1304 mg of 2-naphthaleneacetic acid was weighed, dissolved in 20 mL of anhydrous DMF, added with 3.04 mL of DIEA and 2628 mg of HBTU, fully mixed, and then added to a reactor. The resin was agitated for about 1.5 h with a stream of nitrogen, fully reacted, squeezed with nitrogen to remove the remaining waste liquid.

h) Washing of the Resin

The resin was washed five times for 30 s each respectively with anhydrous DMF-anhydrous DCM-anhydrous MeOH-anhydrous n-hexane in sequence, and finally blow-dried with high-purity nitrogen.

i) Cleavage of the Product from the Resin and Treatment of the Product

The resin was washed 3 times with a 95% trifluoroacetic acid solution (TFA: water=95:5) while high-purity (99.999%) nitrogen was continuously introduced, where the first wash was continued for 2 h, and the second and third washes were continued for 30 min respectively. After full reaction, the cleavage solution was drained and collected, and the TFA was blow dried by an air pump. An appropriate amount of anhydrous diethyl ether was added to the cleavage solution, and the resulting solution was placed in a freezer, and cooled at −20° C. overnight for precipitation. On the following day, a small amount of ultrapure water was added after filtration under suction, and frozen in a freezer. After being freeze-dried, the dried crude product was weighed, and purified by column chromatography (eluting with dichloromethane:methanol=30:1-15:1). The yield of the purified product was 78%.

Embodiment 1

A method for rapid gelation of a silk fibroin solution under physiological conditions of embodiment 1 comprises the following steps.

(1) 0.4 mg of NapFF solid powder was weighed and transferred to the bottom of a glass vial, and then 170 μL of ultrapure water was added.

(2) 8 μL of a 1 mol/L NaOH solution in ultrapure water was added, and ultrasonically dissolved, and the bottom of the vial was heated at 70° C. for 1 min by using a microcomputer electric heating plate capable of precise temperature control, to form a transparent solution.

(3) A 1 mol/L HCl solution in ultrapure water was slowly added and mixed well by stirring with a pipette tip until the pH of the solution is 7.4.

(4) 1.7 μL of a 12.03 wt % silk fibroin solution was added.

(5) Ultrapure water was added to make up the volume to 200 μL.

(6) The vial was stood horizontally and the gelation process was observed by tilting and inverting the glass vial every 10 min.

After standing at room temperature for 1.5 h, gelation occurred, and a highly transparent mixed hydrogel was formed.

Embodiment 2

A method for rapid gelation of a silk fibroin solution under physiological conditions of embodiment 2 comprises the following steps.

(1) 0.8 mg of NapFF solid powder was weighed and transferred to the bottom of a glass vial, and then 170 μL of ultrapure water was added.

(2) 10 μL of a 1 mol/L NaOH solution in ultrapure water was added, and ultrasonically dissolved; and the bottom of the vial was heated at 70° C. for 2 min by using a microcomputer electric heating plate capable of precise temperature control, to form a transparent solution.

(3) A 1 mol/L HCl solution in ultrapure water was slowly added and mixed well by stirring with a pipette tip until the pH of the solution is 7.4.

(4) 1.7 μL of a 12.03 wt % silk fibroin solution was added.

(5) Ultrapure water was added to make up the volume to 200 μL.

(6) The vial was stood horizontally and the gelation process was observed by tilting and inverting the glass vial every 5 min.

After standing at room temperature for 30 min, gelation occurred, and a highly transparent mixed hydrogel was formed.

Embodiment 3

A method for rapid gelation of a silk fibroin solution under physiological conditions of embodiment 3 comprises the following steps.

(1) 0.8 mg of NapFF solid powder was weighed and transferred to the bottom of a glass vial, and then 150 μL of ultrapure water was added.

(2) 12 μL of a 1 mol/L NaOH solution in ultrapure water was added, and ultrasonically dissolved; and the bottom of the vial was heated at 70° C. for 2 min by using a microcomputer electric heating plate capable of precise temperature control, to form a transparent solution.

(3) A 1 mol/L HCl solution in ultrapure water was slowly added and mixed well by stirring with a pipette tip until the pH of the solution is 7.4.

(4) 8.3 μL of a 12.03 wt % silk fibroin solution was added.

(5) Ultrapure water was added to make up the volume to 200 μL.

(6) The vial was stood horizontally and the gelation process was observed by tilting and inverting the glass vial every 5 min.

Figure 4:
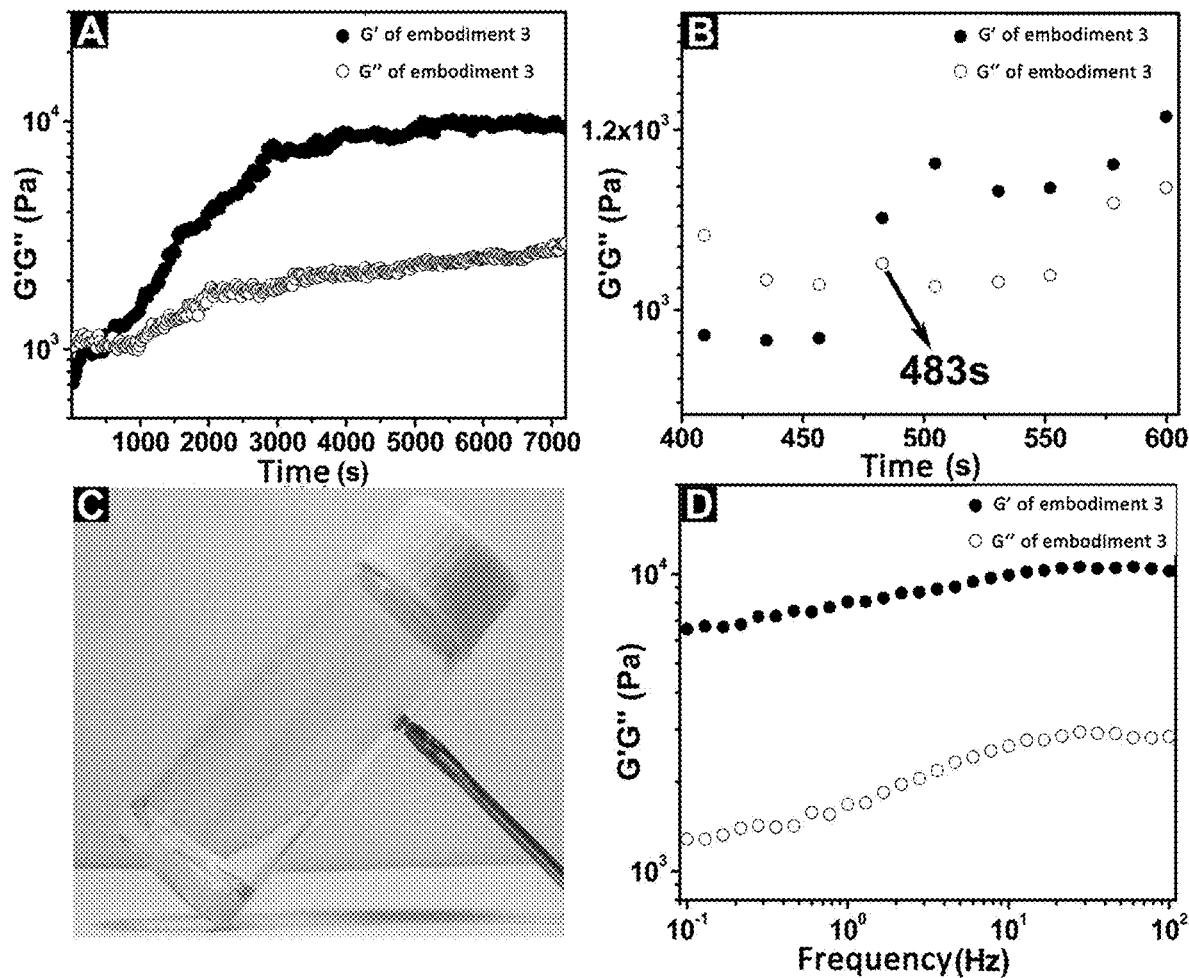
FIG. 4A shows dynamic rheology sweep of embodiment 3.
FIG. 4B shows the determination of a gelation point of embodiment 3 in a dynamic rheology sweep mode.
FIG. 4C shows an optical image of embodiment 3.
FIG. 4D shows the rheological properties of embodiment 3 characterized under frequency sweep.

It was found that after standing at room temperature for 10 min, gelation occurs rapidly and a moderately transparent hydrogel is formed. To further determine the gelation point, the gelation time point was monitored as 483 s (FIG. 4) by dynamic rheology test.

Embodiment 4

A method for rapid gelation of a silk fibroin solution under physiological conditions of embodiment 4 comprises the following steps.

(1) 0.8 mg of NapFF solid powder was weighed and transferred to the bottom of a glass vial, and then 150 μL of ultrapure water was added.

(2) 12 μL of a 1 mol/L NaOH solution in ultrapure water was added, and ultrasonically dissolved; and the bottom of the vial was heated at 70° C. for 2 min by using a microcomputer electric heating plate capable of precise temperature control, to form a transparent solution.

(3) A 1 mol/L HCl solution in ultrapure water was slowly added and mixed well by stirring with a pipette tip until the pH of the solution is 7.4.

(4) 16.6 μL of a 12.03 wt % silk fibroin solution was added.

(5) Ultrapure water was added to make up the volume to 200 μL.

(6) The vial was stood horizontally and the gelation process was observed by tilting and inverting the glass vial every 2 min.

Figure 5:
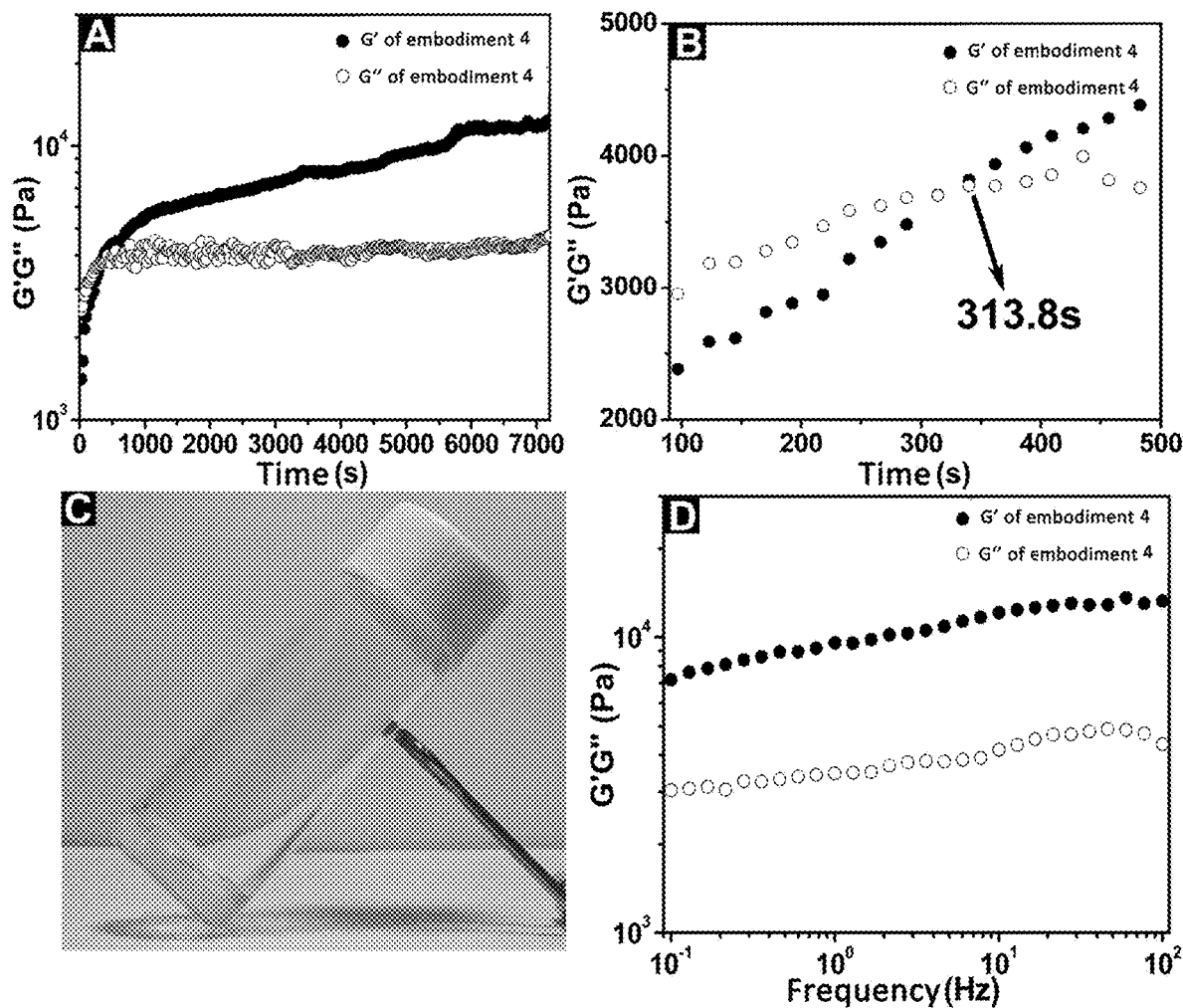
FIG. 5A shows dynamic rheology sweep of embodiment 4.
FIG. 5B shows the determination of a gelation point of embodiment 4 in a dynamic rheology sweep mode.
FIG. 5C shows an optical image of embodiment 4.
FIG. 5D shows the rheological properties of embodiment 4 characterized under frequency sweep.

It was found that after standing at room temperature for 10 min, gelation occurs rapidly and a lowly transparent mixed hydrogel is formed. To further determine the gelation point, the gelation time point was monitored as 313.8 s (FIG. 5) by dynamic rheology test.

Embodiment 5

A method for rapid gelation of a silk fibroin solution under physiological conditions of embodiment 5 comprises the following steps.

(1) 0.8 mg of NapFF solid powder was weighed and transferred to the bottom of a glass vial, and then 130 μL of ultrapure water was added.

(2) 15 μL of a 1 mol/L NaOH solution in ultrapure water was added, and ultrasonically dissolved; and the bottom of the vial was heated at 70° C. for 2 min by using a microcomputer electric heating plate capable of precise temperature control, to form a transparent solution.

(3) A 1 mol/L HCl solution in ultrapure water was slowly added and mixed well by stirring with a pipette tip until the pH of the solution is 7.4.

(4) 33.2 μL of a 12.03 wt % silk fibroin solution was added.

(5) Ultrapure water was added to make up the volume to 200 μL.

(6) The vial was stood horizontally and the gelation process was observed by tilting and inverting the glass vial every 1 min.

Figure 6:
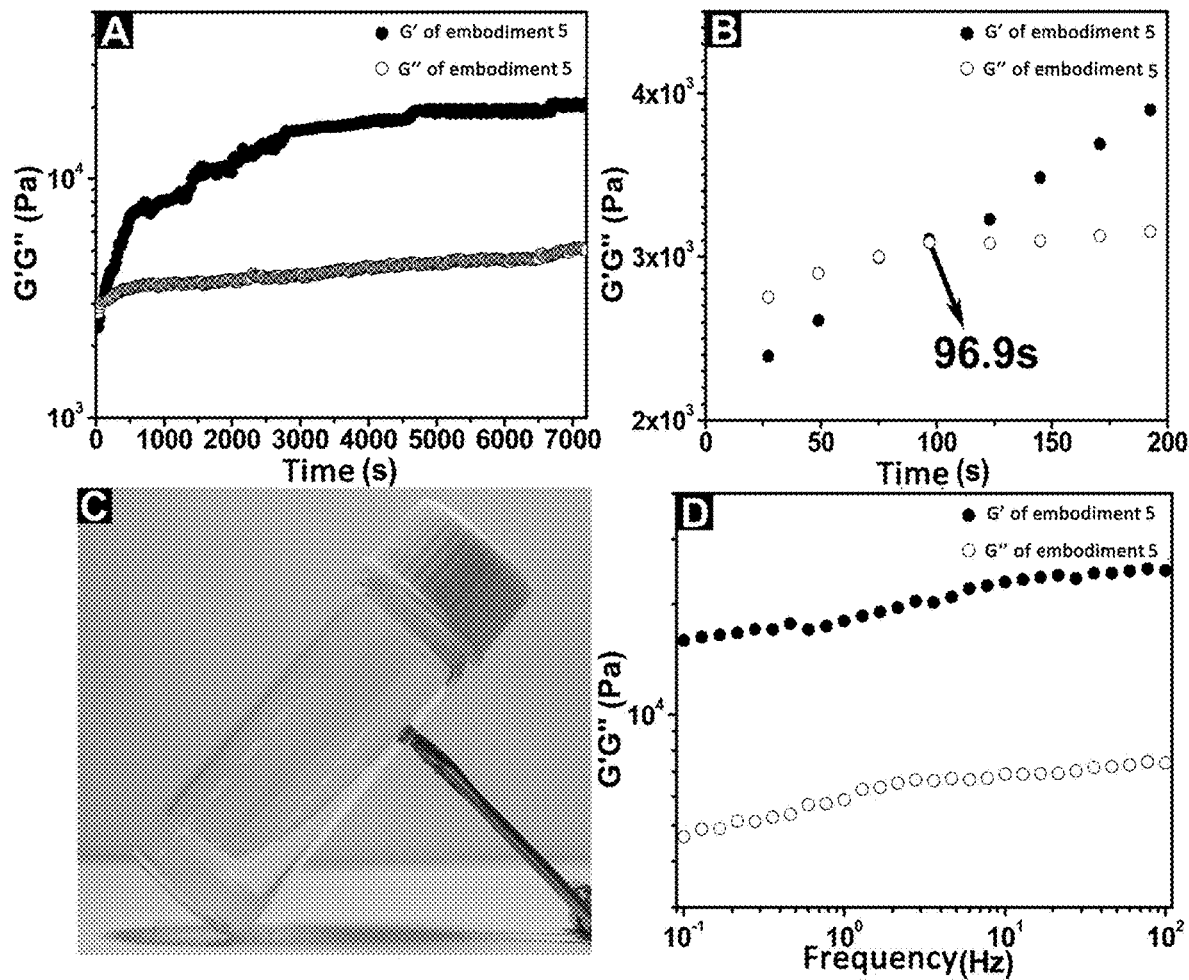
FIG. 6A shows dynamic rheology sweep of embodiment 5.
FIG. 6B shows the determination of a gelation point of embodiment 5 in a dynamic rheology sweep mode.
FIG. 6C shows an optical image of embodiment 5.
FIG. 6D shows the rheological properties of embodiment 5 characterized under frequency sweep.
Figure 7:
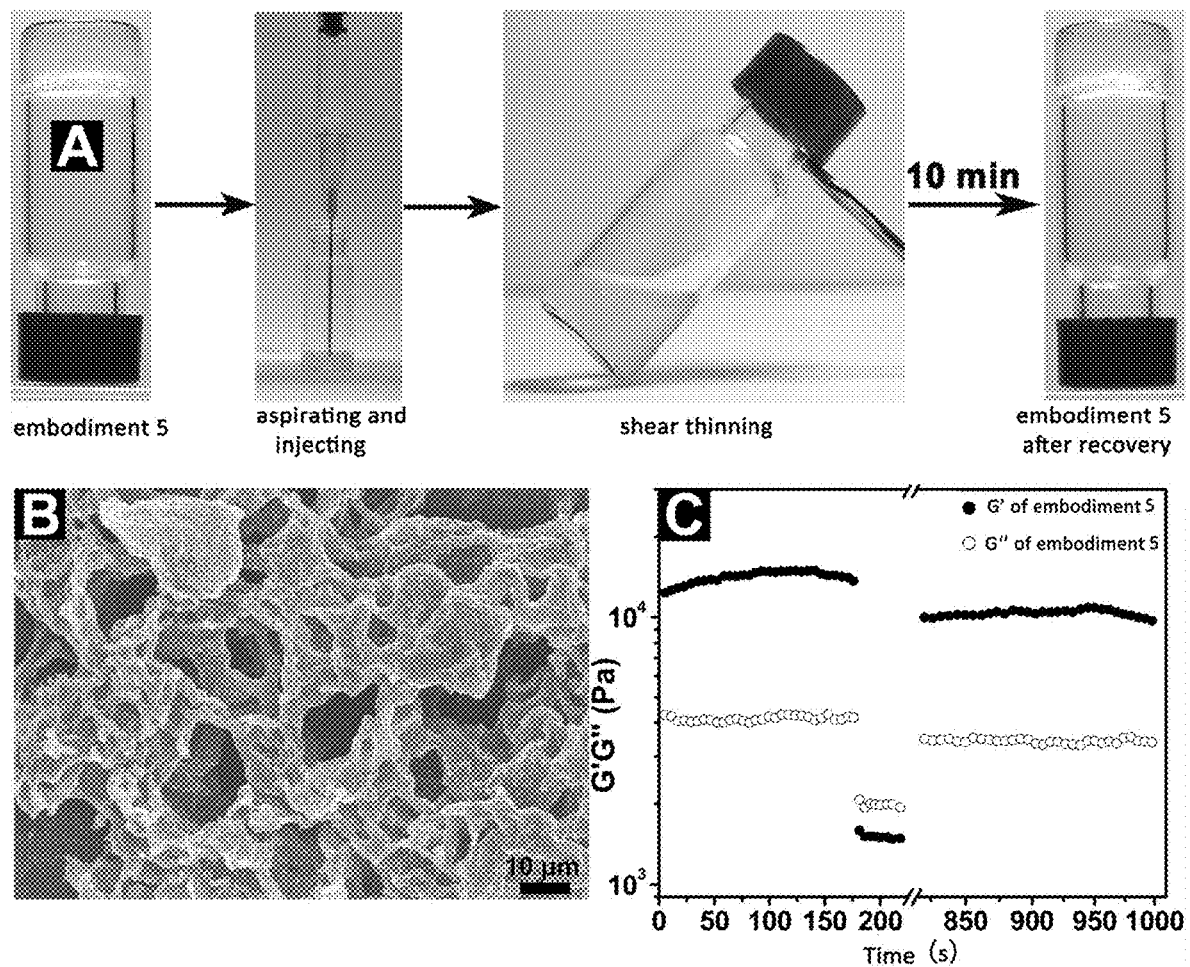
FIG. 7A shows the injectability test results of embodiment 5.
FIG. 7B shows an SEM image of embodiment 5 after recovery.
FIG. 7C shows the changes of storage modulus (G') and loss modulus (G") before and after shear thinning of embodiment 5 as shown by rheological monitoring.
Figure 8:
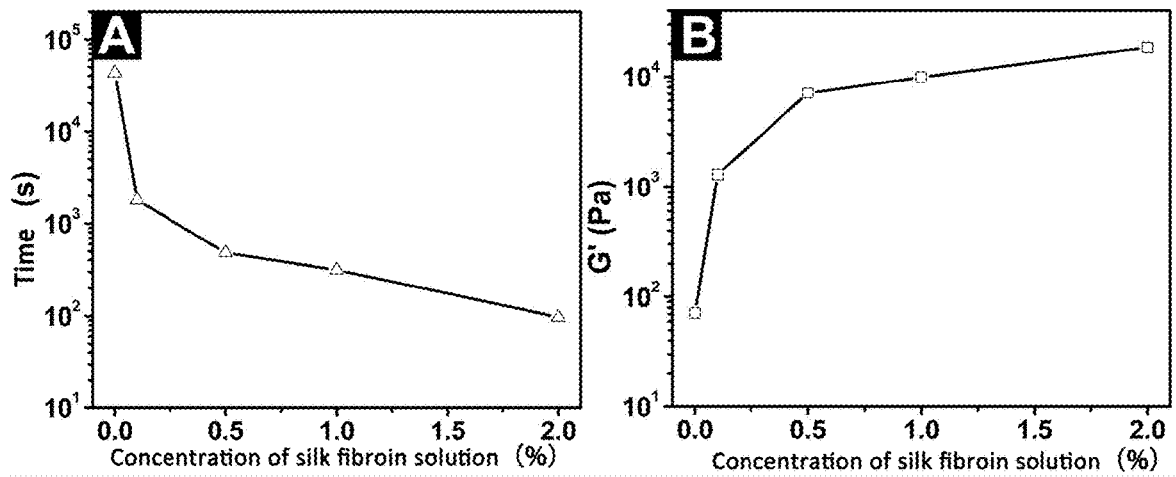
FIG. 8A shows comparison of the gelation times of silk fibroin solutions with various concentrations (0%, 0.1%, 0.5%, 1.0%, and 2.0%) when induced by a 0.4 wt % NapFF solution.
FIG. 8B shows comparison of the storage modulus of gels formed by silk fibroin solutions with various concentrations (0%, 0.1%, 0.5%, 1.0%, and 2.0%) when induced by a 0.4 wt % NapFF solution.

It was found that after standing at room temperature for 5 min, gelation occurs rapidly and a lowly transparent mixed hydrogel is formed. To further determine the gelation point, the gelation time point was monitored as 96.9 s (FIG. 6) by dynamic rheology test.

Comparative Embodiment 1

A method for rapid gelation of a silk fibroin solution under physiological conditions of comparative embodiment 1 comprises the following steps.

(1) 0.8 mg of NapFF solid powder was weighed and transferred to the bottom of a glass vial, and then 170 μL of ultrapure water was added.

(2) 10 μL of a 1 mol/L NaOH solution in ultrapure water was added, and ultrasonically dissolved; and the bottom of the vial was heated at 70° C. for 2 min by using a microcomputer electric heating plate capable of precise temperature control, to form a transparent solution.

(3) A 1 mol/L HCl solution in ultrapure water was slowly added and mixed well by stirring with a pipette tip until the pH of the solution is 7.4.

(4) Ultrapure water was added to make up the volume to 200 μL.

(5) The vial was stood horizontally and the gelation process was observed by tilting and inverting the glass vial.

The NapFF solution was found to form a macroscopically stable and transparent hydrogel after 12 h.

Comparative Embodiment 2

A method for rapid gelation of a silk fibroin solution under physiological conditions of comparative embodiment 2 comprises the following steps.

(1) 33.3 μL of a 12.03 wt % silk fibroin solution was added to the bottom of the glass vial.

(2) Ultrapure water was added to make up the volume to 200 μL.

(3) The vial was stood horizontally and the gelation process was observed by tilting and inverting the glass vial every other day.

(4) The silk fibroin solution was found to form a macroscopically non-transparent hydrogel after standing at room temperature for 14 days.

Comparative Embodiment 3

A method for rapid gelation of a silk fibroin solution under physiological conditions of comparative embodiment 3 comprises the following steps.

(1) 0.2 mg of NapFF solid powder was weighed and transferred to the bottom of a glass vial, and then 180 μL of ultrapure water was added.

(2) 5 μL of a 1 mol/L NaOH solution in ultrapure water was added, and ultrasonically dissolved; and the bottom of the vial was heated at 70° C. for 2 min by using a microcomputer electric heating plate capable of precise temperature control, to form a transparent solution.

(3) A 1 mol/L HCl solution in ultrapure water was slowly added and mixed well by stirring with a pipette tip until the pH of the solution is 7.4.

(4) 1.7 μL of a 12.03 wt % silk fibroin solution was added.

(5) Ultrapure water was added to make up the volume to 200 μL.

(6) The vial was stood horizontally and the gelation process was observed by tilting and inverting the glass vial every 1 min.

It was found that no gelation occurs after standing at room temperature for 24 h or even 7 days.

TABLE 1

Performances of gels obtained by mixing NapFF and silk fibroin solution SF under different conditions

| Sample | Comparative embodiment 3 | embodiment 1 | embodiment 2 | embodiment 3 | embodiment 4 | embodiment 5 |
|---|---|---|---|---|---|---|
| NapFF (wt %) | 0.1 | 0.2 | 0.4 | 0.4 | 0.4 | 0.4 |
| SF (%) | 0.1 | 0.1 | 0.1 | 0.5 | 1.0 | 2.0 |
| pH | 7.4 | 7.4 | 7.4 | 7.4 | 7.4 | 7.4 |
| Critical stress (%) | — | 0.17 | 0.24 | 1.13 | 1.64 | 2.39 |
| G' (Pa) | — | 659 | 1289 | 7051 | 9902 | 18560 |
| Gelation time | —a | 1.5 h | 30 min | 483 s | 314 s | 97 s | aNo gelation occurs after standing for 24 h or more.

The small peptide derivative (NapFF) of the invention has good biocompatibility, low cytotoxicity, readily degradability and other excellent characteristics, and has a mature synthesis route, is simple in purification, and can be massively synthesized. In the induction of silk fibroin to gelate, a 0.1% silk fibroin solution can be induced to form a stable hydrogel within 1.5 h under a physiological condition of pH 7.4 by using only a 0.2 wt % of NapFF solution. After the NapFF content is increased to 0.4 wt %, the gelation time of the 0.1% silk fibroin solution is further shortened to 30 min. After further screening of the ratio of the two components, it is found that after a 0.4 wt % NapFF solution is mixed with a 2.0% silk fibroin solution and stood at room temperature for 97 s, a very stable hydrogel is formed. The gelation point and the mechanical properties of the formed gel are determined by dynamic rheological test. The storage modulus is over ten times stronger than that of the gel formed with a 2.0% silk fibroin solution alone. The results of transmission electron microscopy (TEM) also show that the two components appear as nanofibers of different widths before being mixed; and after being mixed, it can be clearly distinguished from the TEM image that the two components respectively form a network of physically crosslinked nanofibers interpenetrating with each other, and thick nanofiber clusters are also formed.

The cell viability was detected by CCK-8 assay. Human umbilical vein endothelial cells (HUVECs) were dispersed in a 96-well plate (at a cell concentration of 4000 cells/well) and cultured for 24 h in a 5% $CO_2$ atmosphere at 37° C. The previous medium was replaced with a medium containing different concentrations of NapFF (10.0 μM, 20.0 μM, 50.0 μM, 100.0 μM, and 200.0 μM) and silk fibroin solutions (0.1%, 0.2%, 0.5%, 1.0%, and 2.0%), which was in turn replaced with a CCK-8 solution after 24 h. Finally, the optical density value (OD value) of the solution at 450 nm was measured on a microplate reader. The cell viability is expressed as percentage of the number of control (untreated) cells. The cell viability of the control group was set to 100% by default, and all experiments were performed in 5 replications.

Figure 9:
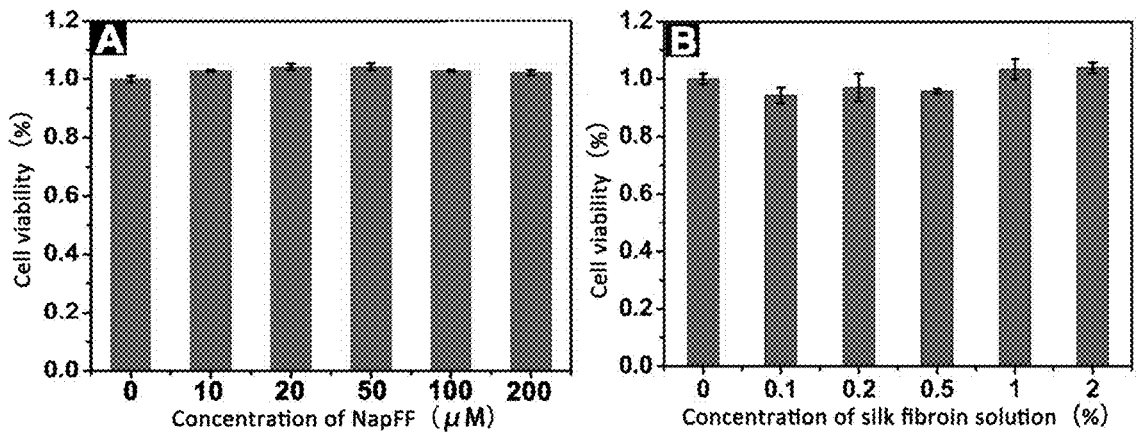
FIG. 9 shows the cytotoxicity of the small peptide derivative of NapFF and the silk fibroin solution tested by a CCK-8 kit method.
Figure 10:
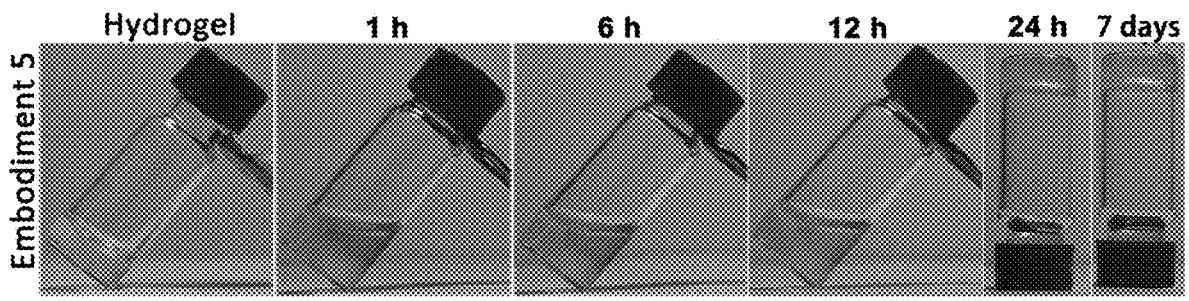
FIG. 10 shows the results of a soaking stability test of embodiment 5 in a high glucose medium (DMEM).

It can be concluded from the test results shown in FIG. 9 that the NapFF synthesized has good biocompatibility, and the silk fibroin solution is also non-toxic to cells.

A 5-day culture experiment of human umbilical vein endothelial cells (HUVECs) was carried out on the surface of embodiment 5.

The cell count was obtained by a hemocytometer method. The specific steps were as follows.

1. Depending on the concentration, the trypsinized cell suspension was diluted with DMEM appropriately.
2. A clean hemocytometer was covered with a cover slide on the count block.
3. The cell suspension was shaken until uniform, aspirated with a 10 μL pipette tip and dropped to the groove on both sides of the belly board of the hemocytometer along the edge of the cover slide to fill the count block without causing bubbles to produce.
4. After standing for a moment, the cells were settled down to the hemocytometer and did not drift with the liquid any longer. The hemocytometer was placed and held steadily on an object stage of a microscope. After the count block was found at a low magnification, the cells were observed and counted under a high magnification.
5. A single count block was composed of 16 middle grids, the number of cells in the upper left, lower left, upper right, and lower right middle grids in the diagonal orientation (i.e., 16*4 small grids) was counted. In order to ensure the accuracy of count, and avoid repeated count and unrecording, a uniform rule was set for the statistics of cells on the gridline when counted. For example, if the cells were located on a double gridline of a large grid, the cells on the upper line were counted, but not the cells on the lower line, and the cells on the left line were counted, but not the cells on the right line, to reduce the error. That is, the cells located on the upper line and the left line of the grid were ascribed to the grid, and the cells on the lower line and the right line of the grid were ascribed to a corresponding grid according to the rule.
6. After counting, the average number n of the cells in each middle grid were calculated, the cover slide was removed, the hemocytometer was washed with 75% ethanol, air dried, and stored in the box;
7. The cell density in the original cell suspension was $n*10^4$ cells/mL.
8. The stained cells were counted using ImageJ software and the cell counts were averaged using five plots under different fields of view.

Figure 11:
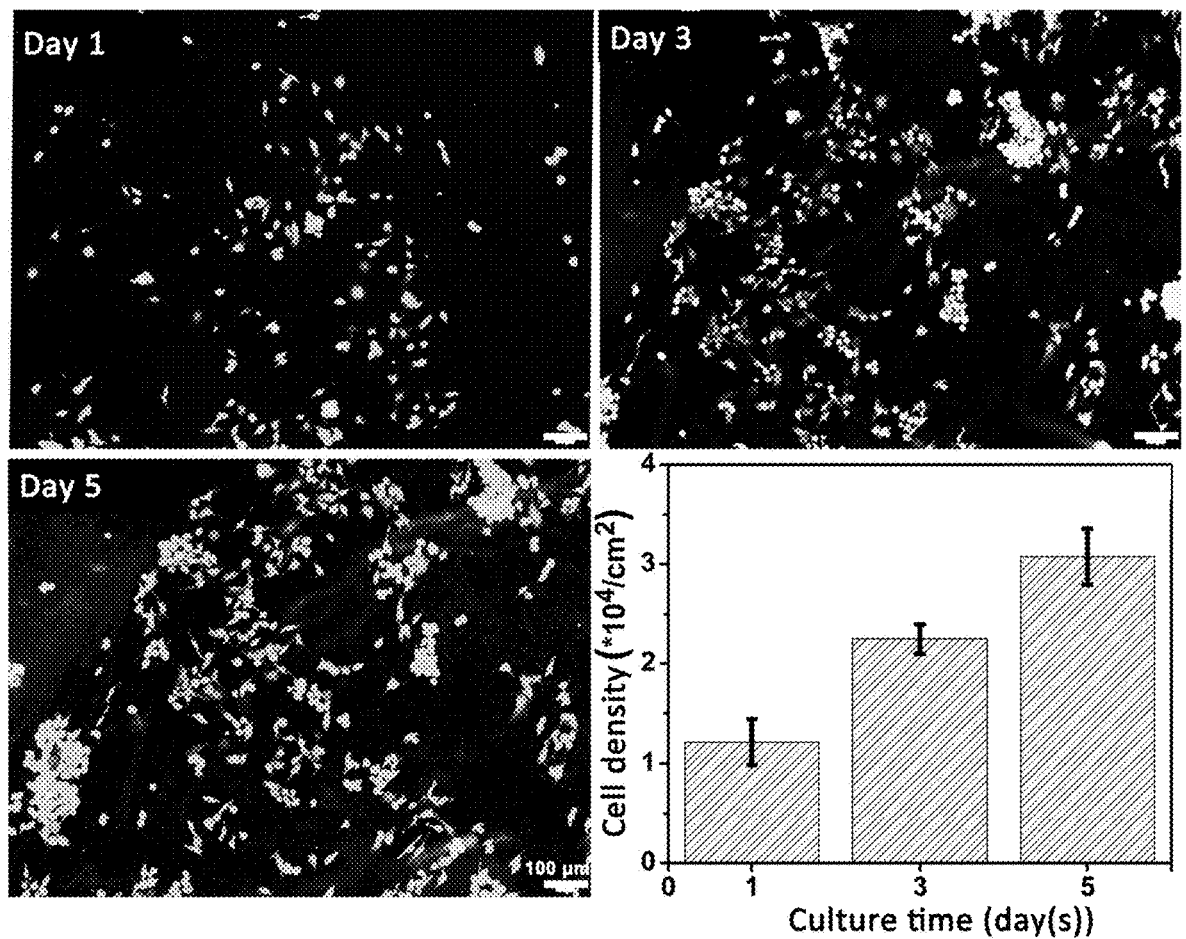
FIG. 11 shows the results of a 5-day culture experiment of human umbilical vein endothelial cells (HUVECs) on the surface of embodiment 5.

The experimental results are shown in FIG. 11.

The small molecule peptide derivative NapFF of the application can induce a low concentration of silk fibroin solution to gelate under physiological conditions. The hydrogel obtained by mixing a 2.0% silk fibroin solution with a 0.4 wt % NapFF solution is injectable, and this indicates that the introduced polypeptide small molecule gelatin factor has a very significant effect on the gelation of silk fibroin. This allows the silk fibroin solution to gelate rapidly in only tens to hundreds of seconds at a low concentration and pH 7.4. The resulting gel has a mechanical performance that is over ten times higher than that of the hydrogel formed with silk fibroin alone. The obtained hybrid gel has good biocompatibility and can be used as a potential scaffold material for cell culture. Compared with the organic small molecules such as ethanol, surfactants and high molecular polymers conventionally used to induce silk fibroin to gelate, the polypeptide small molecule has the advantages of mild induction conditions, economical synthesis, rapid induction, good biocompatibility of the hybrid gel, whereby the ability of silk fibroin as a new biomaterial with good biocompatiblity can be further extended and expanded.

What is claimed is:
1. A method for gelation of a silk fibroin solution under physiological conditions, comprising steps of:

(1) weighing 0.4-0.8 mg of 2-naphthaleneacetic acid-phenylalanine-phenylalanine solid powder into the bottom of a glass vial and adding 130-170 µL of ultrapure water;
(2) adding 8-12 µL of a 1 mol/L NaOH solution in ultrapure water, ultrasonically dissolving, and heating the bottom of the vial for 1-2 min to form a transparent solution;
(3) adding a HCl solution in ultrapure water and mixing well by stirring with a pipette tip until the pH of the solution is 7.2-7.5;
(4) adding 1-34 µL of a silk fibroin solution;
(5) adding ultrapure water to make up the volume; and
(6) standing horizontally, tilting and inverting the glass vial every 1 min-1 h, to allow the silk fibroin solution to gelate.

2. The method for gelation of a silk fibroin solution under physiological conditions according to claim 1, wherein in Step (2), a microcomputer electric heating plate capable of precise temperature control is used for heating at 70° C.

3. The method for gelation of a silk fibroin solution under physiological conditions according to claim 1, wherein in Step (3), the HCl solution added has a molar concentration of 1 mol/L.

4. The method for gelation of a silk fibroin solution under physiological conditions according to claim 1, wherein in Step (4), the silk fibroin solution has a concentration of 12.03 wt %.

5. The method for gelation of a silk fibroin solution under physiological conditions according to claim 4, wherein the silk fibroin solution is prepared by steps of:

Step 1: silk degumming
weighing 6.36 g of anhydrous sodium carbonate to dissolve in 3 L of ultrapure water, adding 7.5 g of silk and boiling for 1 h, then removing the silk and air drying overnight at room temperature, to obtain degummed silk;

Step 2: silk dissolution
preparing 40 mL of a 9.3 M LiBr solution, adding the degummed silk and 30 ml of the LiBr solution to a round bottom flask, and stirring for 4 h at a temperature of 60° C. and a rotation speed of 200 rpm;

Step 3: dialysis of silk fibroin solution
transferring the LiBr solution into which silk fibroin is dissolved to a dialysis bag with a molecular weight cut off of 3500, and dialyzing against ultrapure water for 4 days by changing the ultrapure water every 1 h, and then changing the ultrapure water every 2-5 hours after 10 hours;

Step 4: solution concentration
after LiBr is completely dialyzed out, removing the dialysis bag, applying PEG20000 evenly on the surface of the dialysis bag for water absorption and concentration, applying an appropriate amount of PEG20000 again after the PEG20000 on the surface becomes viscous, and concentrating for one day until the solution becomes yellowish;

Step 5: centrifugation
centrifuging the concentrated solution at 4° C. and 4000 r/min for 40 min, collecting the supernatant after centrifugation, and discarding a small amount of impurities; and Step 6: concentration determination determining the concentration of silk fibroin by a subtraction method, comprising preparing a clean glass evaporating dish, accurately weighing the clean glass evaporating dish using an analytical balance with an accuracy of 1/10000 g, and recording the weight as $m_0$;
pipetting 100 µL of the silk fibroin solution onto the evaporating dish, accurately weighing the evaporating dish using an analytical balance with an accuracy of 1/10000 g, and recording the weight as $m_1$; drying the glass evaporating dish containing the silk fibroin solution for 5-6 h in an oven at 60° C., removing, cooling, and accurately weighing the evaporating dish, and recording the weight as $m_2$; and then calculating the concentration according to a formula:

$$c = \frac{m_2 - m_0}{m_1 - m_0} \times 100\%,$$

wherein the concentration determined is an average of the measurements from three parallel glass evaporating dishes; and the average concentration of the silk fibroin (SF) solution is determined as 12.03%.

6. The method for gelation of a silk fibroin solution under physiological conditions according to claim 1, wherein in Step (5), the volume is made up to 200 µL.

7. The method for gelation of a silk fibroin solution under physiological conditions according to claim 1, wherein in Step (3), the pH of the solution is 7.4.

8. The method for rapid gelation of a silk fibroin solution under physiological conditions according to claim 1, wherein in Step (4), the volume of the silk fibroin solution is 34 µL.

\* \* \* \* \*